United States Patent Office 3,560,023
Patented Feb. 2, 1971

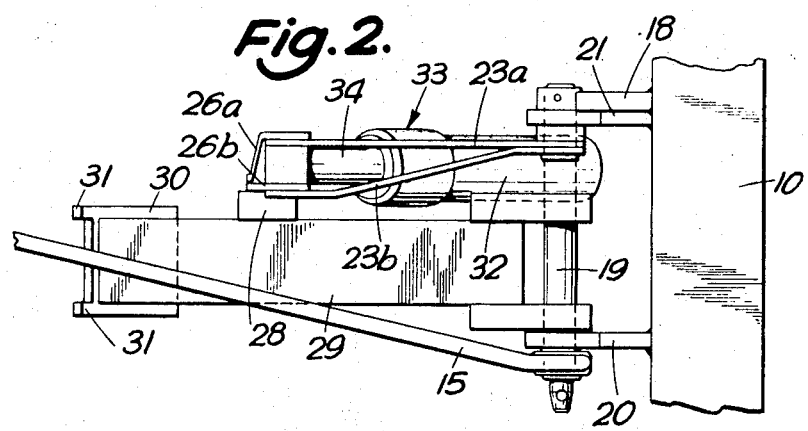
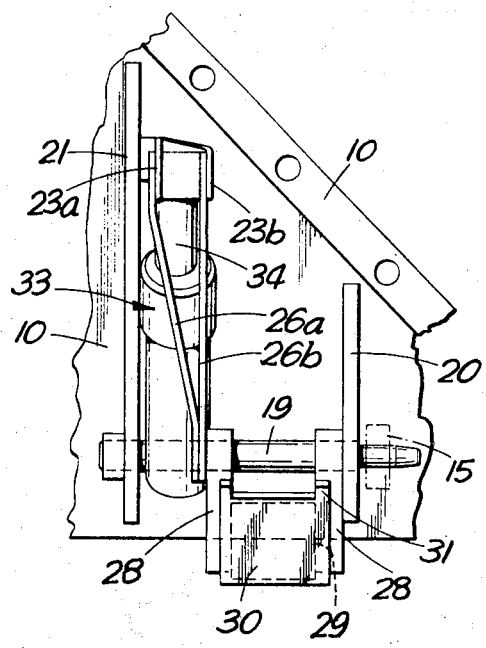

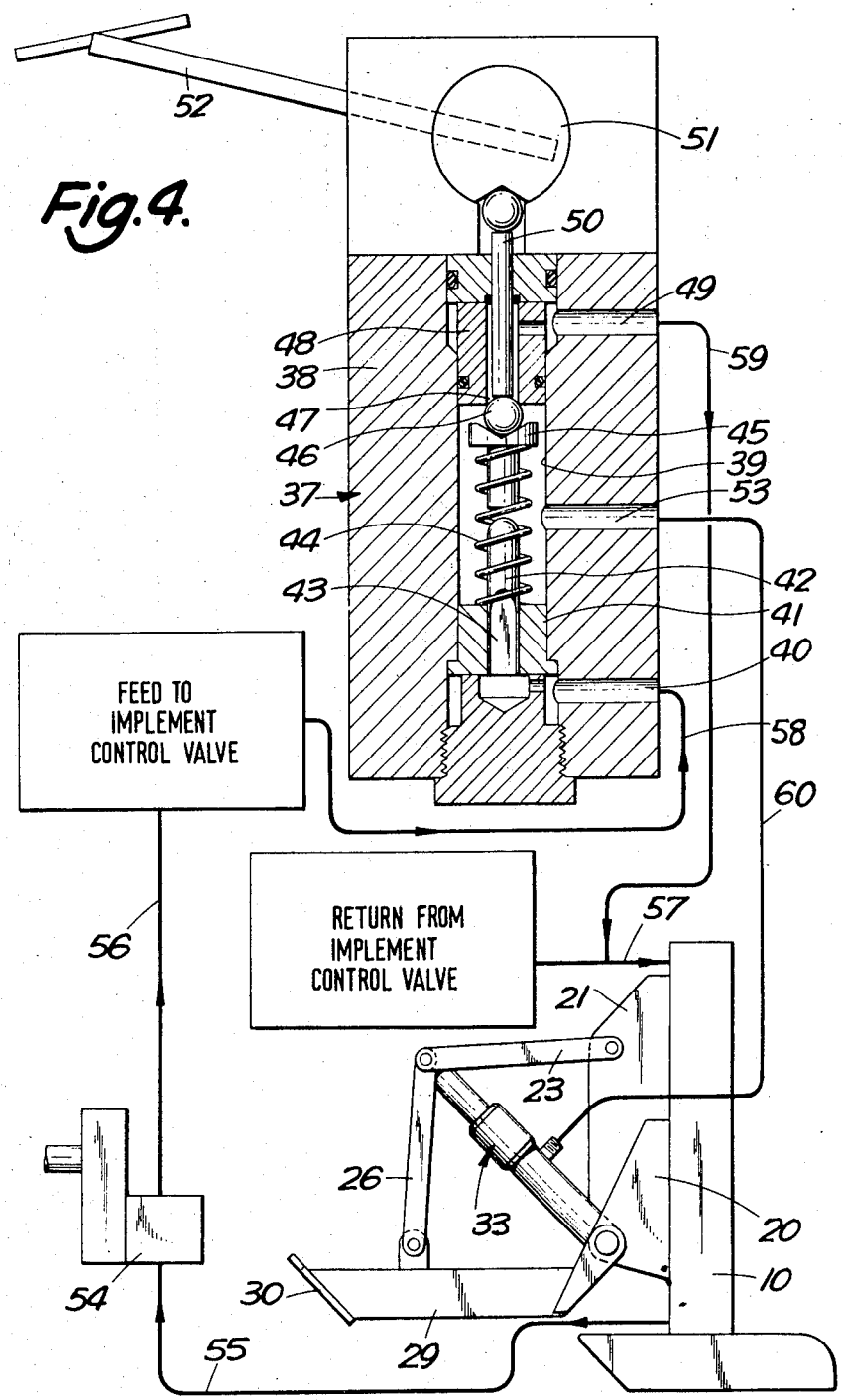

3,560,023
GROUND ENGAGING IMPLEMENT SUPPORTS FOR ATTACHMENT TO TRACTORS
Harry William Norton and Ian Robertson, Ludlow, England, assignors to F. W. McConnell Limited, Ludlow, England, a British company
Filed Feb. 28, 1969, Ser. No. 803,362
Claims priority, application Great Britain, Mar. 1, 1968, 10,134/68
Int. Cl. B60s 9/10
U.S. Cl. 280—475         7 Claims

ABSTRACT OF THE DISCLOSURE

A ground engaging support for attachment to a tractor comprises a support structure on which an implement may be mounted, which support structure is adapted for attachment to a tractor by means of pivotal connections between the support structure and upper and lower links extending rearwardly on the tractor, so that the support structure may be brought into and out of contact with the ground by swinging the links. A subsidiary pivoted linkage is connected between the support structure and at least one of the links an hydraulic ram being provided to deform the subsidiary linkage in a manner to impart a downward load to the support structure when it is in engagement with the ground.

---

The invention relates to ground engaging implement supports for attachment to tractors and of the kind comprising a support structure on which an implement may be mounted, which support structure is adapted for attachment to a tractor by means of pivotal connections between the support structure and upper and lower links extending rearwardly on the tractor, so that the support structure may be brought into and out of contact with the ground by swinging the links. Normally there are provided two lower, draft links and a single top link, and the draft links are raised and lowered by drop links which connect them to hydraulically powered lift arms of the tractor.

According to the invention there is provided a ground engaging implement support of the kind first referred to wherein there is adapted for connection between the support structure and at least one of said links an adjustable mechanism, adjustment of the mechanism in one sense being adapted to impart a downward load to the support structure when it is in engagement with the ground.

The adjusttable mechanism preferably comprises a fluid energized ram, such as an hydraulic ram.

The adjustable mechanism may comprise a subsidiary pivoted linkage adapted for connection between the support structure and said link, means being provided to deform the subsidiary linkage in a manner to impart said downward load to the support structure. In the case where a fluid energized ram is provided, the ram may comprise the means for deforming the subsidiary linkage.

Preferably there is provided a lost motion connection between the adjustable mechanism and the link.

In the case where the adjustable mechanism comprises a subsidiary linkage the lost motion connection may be provided by a part of the subsidiary linkage being unattached to, but engageable with, said link. For example, in the case where said link is a lower, draft link of the tractor, the subsidiary linkage may be wholly attached to the support structure and may have a part adapted to engage beneath the draft link at a location spaced away from the pivotal connection between the draft link and the support structure.

In the case where two lower draft links are provided there may be provided two separate adjusting mechanisms each adapted to operate on one of the draft links. Alternatively a single adjusting mechanism may be adapted to operate on both draft links.

In any of the above arrangements in which the adjusting mechanism comprises a fluid energised ram, the ram may comprise a single acting ram, extension of which ram is arranged to impart the downward load to the support structure.

In the case where the implement to be carried by the support is hydraulically operated, said ram may be a single acting hydraulic ram connected to the valve controlling the supply of hydraulic fluid to the implement in such manner that fluid under pressure is supplied to the ram, through a check valve, every time fluid under pressure is supplied to the implement.

Preferably the fluid under pressure is supplied to the ram through a manually operable valve adapted, in one position thereof, to vent the ram to exhaust whereby supply of fluid under pressure to the implement no longer energises the ram.

The following is a more detailed description of one embodiment of the invention reference being made to the accompanying drawings in which:

FIG. 2 is a plan view of half of the connection shown in FIG. 1;

FIG. 3 is a front view of the half of the connection shown in FIG. 2; and

FIG. 4 is a diagrammatic section through a valve controlling the hydraulic ram in the arrangement of FIGS. 1 to 3, showing also the hydraulic connections between the valve and the ram.

Figure 1:
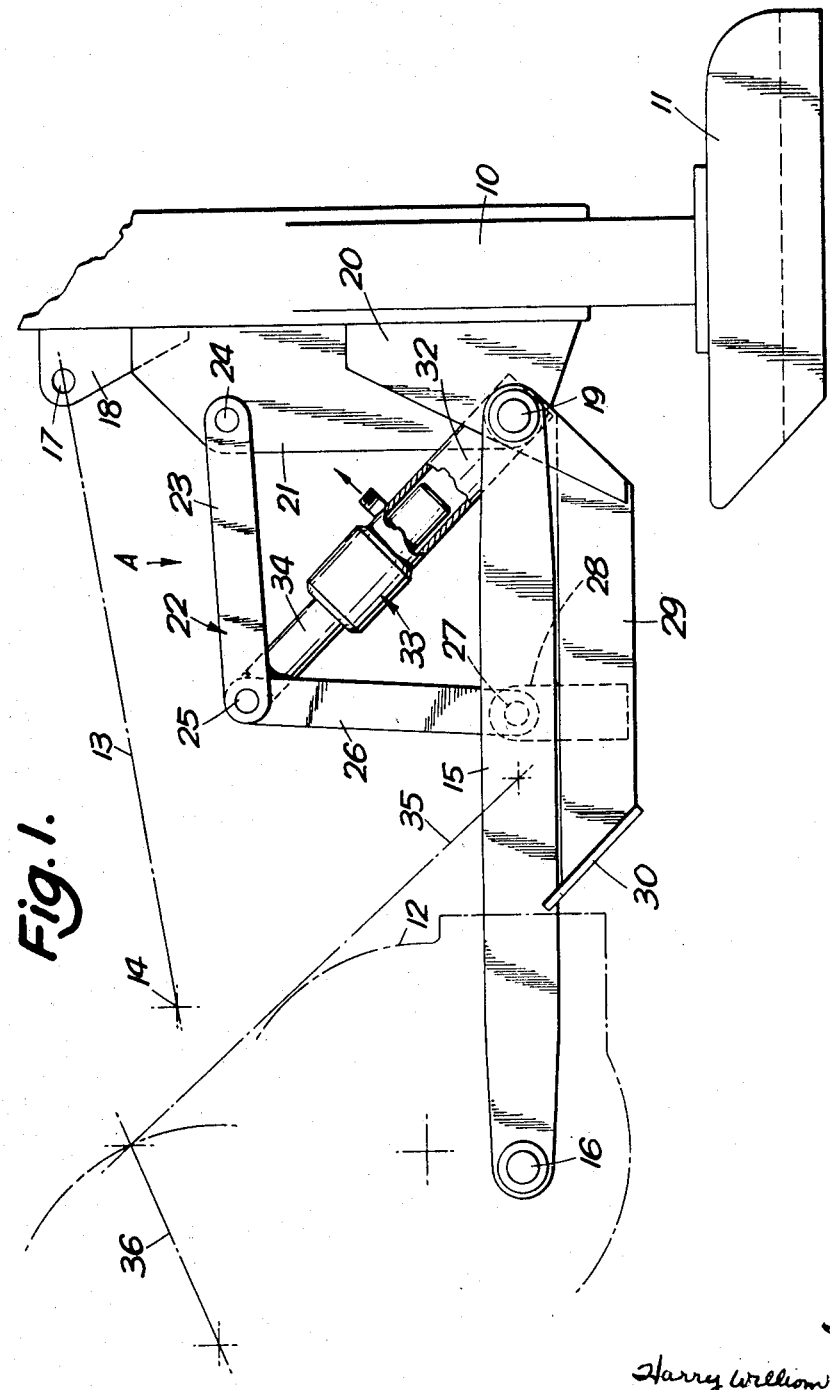
FIG. 1 is a side elevation showing the connection of a ground-engaging implement support to a tractor.

Part of the support structure for the implement is indicated at 10 and the structure is formed at its base with two spaced feet 11, which straddle the fore-and-aft axis of the tractor and prevent the support structure sinking into soft ground. The support structure may be arranged for the support of any known kind of implement, such as a digger, trencher, loader, hedge cutter etc.

Three links extend rearwardly from the back of the tractor (indicated at 12). These links comprise in conventional manner, a top link (the centre line of which is indicated at 13 (which is pivotally connected to the rear of the tractor at 14, and two draft links 15 (only one of which is shown) pivotally connected to the rear of the tractor at 16 and diverging outwardly as they extend rearwardly from the tractor.

The rear end of the top link 13 is pivotally connected at 17 to a central bearing plate 18 welded on the front side of the support structure 10. The rear end of each draft link 15 is pivotally connected to a bearing shaft 19 which extends between two bearing plates 20 and 21 welded on the front side of the support structure 10. Only one pair of plates 20 and 21 and associated structure, are shown in the drawing. The structure associated with the other draft link 15 on the other side of the support structure is a mirror image of that shown.

There is pivotally mounted on the support structure 10 two subsidiary linkages, one of which is indicated generally at 22. The subsidiary linkage comprises an upper link 23 pivotally connected at one end to the bearing plate 21 by means of a pivotal connection 24 spaced vertically above the bearing shaft 19. As best seen in FIG. 2 the link 23 comprises two diverging members 23a and 23b, the diverging ends of the members being pivotally connected, by means of a pivot pin 25 to the upper end of a further link 26 which also comprises two diverging members 26a and 26b. The lower end of the link 26 is pivotally connected by means of a pivot pin 27 to a lug 28 which is welded to the side of a lifting arm 29.

The lifting arm 29 is pivotally mounted at one end on the bearing shaft 19 and towards its other end is disposed beneath a part of the draft link 15 spaced away from the bearing shaft 19, as best seen in FIG. 2. There is provided on the lifting arm 29 an end plate 30 having upwardly projecting ears 31 on opposite sides of the draft link 15 to locate the link with respect to the lifting arm 29.

The cylinder 32 of a single acting hydraulic ram 33 is pivotally mounted on each bearing shaft 19 and the plunger 34 of the ram is pivotally connected to the pivot pin 25 which joins the links 23 and 26.

Drop links, the central axis of one of which is indicated at 35, are connected in conventional manner between the draft links 15 and hydraulically operated lift arms on the tractor, the axis of one such lift arm being indicated at 36.

There is shown diagrammatically in FIG. 4 an hydraulic control valve and associated hydraulic circuit for the ram 33. Two such valves are provided, one to operate each of the two rams 33.

The control valve is indicated generally at 37 and comprises a block 38 formed with a central bore 39. An inlet passage 40 communicates with the bore 39 through a bush 41 in which is reciprocable a circular cross-section piston 42. At one end the piston 42 has three flats 43 ground on it and is urged into the bore in the bush 41 by a helical compression spring 44 so that when the pressure in the inlet passage 40 is sufficient to overcome the force of the spring 44 and the fluid pressure in the bore 39 the piston 42 moves out of the bore in the bush 41 to an extent where hydraulic fluid may flow through the bush 41, past the flats 43 on the piston 42.

The helical spring 44 encircles a member 45 spaced from the piston 42, which member engages a ball 46 which seats on a valve seat 47 at the end of a bore in a bush 48 disposed at the opposite end of the bore 39 to the bush 41. An outlet passage 49 leads through the block 38 from the bore in the bush 48. A push rod 50 extends through the bore in the bush 48 and the end of the push rod passes through a gland in the end of the bore 39 and is engaged by a rotatable cam 51 which is operated by a pedal 52.

It will be seen that by depressing the pedal 52 the ball 46 is moved away from its seat 47 placing the bore 39 in communication with the outlet passage 49. The pedal 52 is biassed by a spring (not shown) so that when pressure on the pedal is released it returns to the position shown in FIG. 4. However, the pedal is so arranged that when it is raised against the action of the spring it eventually passes over a dead centre position so that it is retained in the raised position by the spring, thereby maintaining the push rod 50 depressed and holding the ball 46 away from its seat.

Both control valves 37 are operated by the same pedal 52.

A service passage 53 leads from the part of the bore 39 between the bushes 41 and 48.

As seen in FIG. 4 an hydraulic pump 54 driven by the power take-off shaft of the tractor pumps hydraulic fluid through a conduit 55 from a fluid reservoir built into the support structure 10 and supplies hydraulic fluid under pressure via a conduit 56 to the control valve (not shown) of the implement, such as a digger, carried by the support structure. The low pressure return conduit 57 from the implement control valve leads back to the reservoir in the support structure 10. The inlet passage 40 to the valve 37 is connected by a conduit 58 to the supply conduit 56 and the outlet passage 49 of the valve 37 is connected by a conduit 59 to the return conduit 57. The service passage 53 in the valve 37 is connected to the hydraulic ram 33 by a conduit 60.

The operation of the apparatus is as follows:

With the lift arms of the tractor raised the draft links 15 are also raised and the support structure 10 is held away from the ground so that it may be transported by the tractor. During this condition the pedal 52 is kicked over the dead centre position as referred to earlier so that the ball 46 in the control valve 37 is off its seat and the rams 33 are in communication with exhaust by the conduit 60, bore 39, passage 49 and conduits 59 and 57.

When the required working location is reached the tractor lift arms are swung downwardly in the conventional manner to lower the draft links 15 and lower the support structure 10 onto the ground. When the feet 11 of the support structure 10 are freely resting on the ground, the pedal 52 is kicked back to the position shown in FIG. 4. As soon as the implement carried by the support structure 10 is operated, hydraulic pressure builds up in the conduit 56 leading from the pump 54 to the implement control valve and this pressure is therefore also transmitted along the conduit 58 to the two valves 37. This pressure opens the piston valves 41, 42 and supplies fluid under pressure to the rams 33 via the conduits 60. The rams 33 therefore extend and deform the linkages 22 by forcing the pivot pins 25 away from the bearing shafts 19. This brings the lifting arms 29 up into engagement with the undersides of the draft links 15 and the force exerted on the underside of the draft links 15 by the lift arms 29 causes a downward load to be exerted on the support structure 10 pressing it downwardly firmly into engagement with the ground. This ensures that operation of the implement which is mounted on the support structure does not dislodge or lift the support structure 10 from the ground. The valves 41, 42 act as check valves to lock the fluid pressure in the rams 33.

In conventional arrangements, where the implement is a digger or similar implement, it is common practice, when it is required to move the tractor and implement forward to do this by engaging the implement with the ground and applying a force with the implement so as to "walk" the tractor and support structure backwards or forwards. With the described arrangement this would not be possible with the support structure 10 being loaded downwardly as described, since operation of the implement to "walk" the tractor and structure forwards would energise the rams 33 and urge the structure 10 downwardly thus preventing this walking action.

In the present arrangement, if the operator requires to walk the tractor and structure forwards, he first depresses the pedal 52 against the action of its spring so as to push the ball 46 off its seat and temporarily place the rams 33 in communication with exhaust. The rams 33 do not then load the structure 10 and the structure 10 simply rests on the ground under its own weight. The operator may then use the implement to walk the tractor and structure forwards or backwards without them energising the rams 33.

When it is required to raise the implement support structure 10 from the ground for transport, the pedal 52 is kicked over the dead-centre position, as referred to earlier, so that the ball 46 is held off its seat so as to place the rams 33 into communication with exhaust. The linkages 22 and rams 33 are then completely free and the support structure may be raised in the conventional manner by swinging up the tractor lift arms.

It will be appreciated that many modifications may be made to the arrangement described without departing from the scope of the invention. For example, the rams 33 may be arranged in various other ways to apply the required load between the draft links 15 and the support structure 10. Alternatively the rams may be replaced by some other adjusting mechanism such as a mechanical ratchet mechanism.

Although in the arrangement described there are provided two rams, two subsidiary linkages, and two lifting arms 29, it will be appreciated that there may be provided only a single mechanism, operated by a single ram, to operate on both draft links 15.

Such a modification might use a single ram to operate both lifting arms 29 via a torsionally stiff cross shaft or by building the two arms as part of a common assembly.

The described arrangement is preferable however since it permits one draft link to be swung relatively to the other so that the machine is prevented from rolling sideways firmly into engagement with the uneven ground by tilting the support structure about a fore-and-aft axis.

Since there is a separate valve controlling each of the rams 33 there can be no flow from one ram to the other so that the machine is prevented from rolling sideways relative to the tractor. However, since both rams are fed from the common implement supply conduit 56, the same load will be applied to each ram.

In some applications it may be important that the force developed by the rams 33 and applied to the links 15 should not be sufficient to raise the tractor clear of the ground as this would mean that the rams operated through their full stroke every time and this would cause undesirable tilting of the support structure 10.

We claim:

1. A ground engaging implement support for attachment to a tractor comprising: a support structure on which an implement may be mounted, which support structure is adapted for attachment to a tractor by means of pivotal connections between the support structure and upper and lower links extending rearwardly on the tractor, so that the support structure may be brought into and out of contact with the ground by swinging the links, and an adjustable mechanism connected between the support structure and at least one of said links, the adjustable mechanism comprising a subsidiary pivoted linkage connected between the support structure and said link, means being provided to deform the subsidiary linkage in a manner to impart a downward load to the support structure when it is in engagement with the ground.

2. The combination with a tractor of a ground engaging implement support according to claim 1.

3. A ground engaging implement support according to claim 1, and in which the adjustable mechanism includes a hydraulic ram wherein an implement to be carried by the support is hydraulically operated, and said ram is a single acting hydraulic ram connected to a valve controlling the supply of hydraulic fluid to the implement in such a manner that fluid under pressure is supplied to the ram, through a check valve, every time fluid under pressure is supplied to the implement.

4. A ground engaging implement support according to claim 3, wherein fluid under pressure is supplied to the ram through a manually operable valve adapted, in one position thereof, to vent the ram to exhaust whereby supply of fluid under pressure to the implement no longer energises the ram.

5. A ground engaging implement support according to claim 1, wherein a part of the subsidiary linkage is unattached to, but engageable with, said link to provide a lost motion connection.

6. A ground engaging implement support according to claim 5, wherein the subsidiary linkage is wholly attached to the support structure and has a part adapted to engage beneath a draft link of the tractor at a location spaced away from a pivotal connection between the draft link and the support structure.

7. A ground engaging implement support according to claim 6, wherein two lower draft links are provided on the tractor and there are provided two separate adjusting mechanisms each adapted to operate on one of the draft links.

References Cited

UNITED STATES PATENTS

| | | | |
|---|---|---|---|
| 2,718,312 | 9/1955 | Pilch | 214—138(X) |
| 2,781,927 | 2/1957 | Holopainen | 214—138 |
| 2,931,525 | 4/1960 | Davis | 280—150(X) |
| 3,371,435 | 3/1968 | Miller | 214—138(X) |

LEO FRIAGLIA, Primary Examiner

L. J. PAPERNER, Assistant Examiner

U.S. Cl. X.R.

172—464, 501; 212—145; 280—150